United States Patent [19]

Frantom et al.

[11] Patent Number: 5,066,038
[45] Date of Patent: Nov. 19, 1991

[54] DRIVER SIDE HYBRID INFLATOR AND AIR BAG MODULE

[75] Inventors: Richard L. Frantom, Richmond; David A. Pickett, Roseville; William E. Rogerson, Rochester, all of Mich.; James Rose, Fairfax; Robert Schubert, Sterling, both of Va.

[73] Assignee: Bendix Atlantic Inflator Company, Troy, Mich.

[21] Appl. No.: 560,937
[22] Filed: Jul. 31, 1990
[51] Int. Cl.$^5$ .............................................. B60R 21/26
[52] U.S. Cl. ....................................... 200/737; 200/731
[58] Field of Search ................ 280/731, 736, 737, 741

[56] References Cited

U.S. PATENT DOCUMENTS 3,506,281 4/1970 Berryman .......................... 280/731
3,891,233 6/1975 Damon ............................... 280/737
3,901,530 8/1975 Radke ................................ 280/736

FOREIGN PATENT DOCUMENTS 2112006 8/1977 Fed. Rep. of Germany ...... 280/737

Primary Examiner—Kenneth R. Rice

[57] ABSTRACT

A device (60) for inflating an air bag (36) adapted within a steering wheel comprising: a pressure vessel (66; 166; 210) formed of a length of narrow tubing for storing a quantity of inert gas under pressure and a rupturable disk (80) for enclosing a first end of the tubing; an activator or initiator such as a squib (120) responsive to a control signal indicative of a vehicular crash situation for opening the seal means to permit the pressurized gas to inflate the air bag and a manifold (50) for communicating released gas to an air bag.

11 Claims, 4 Drawing Sheets

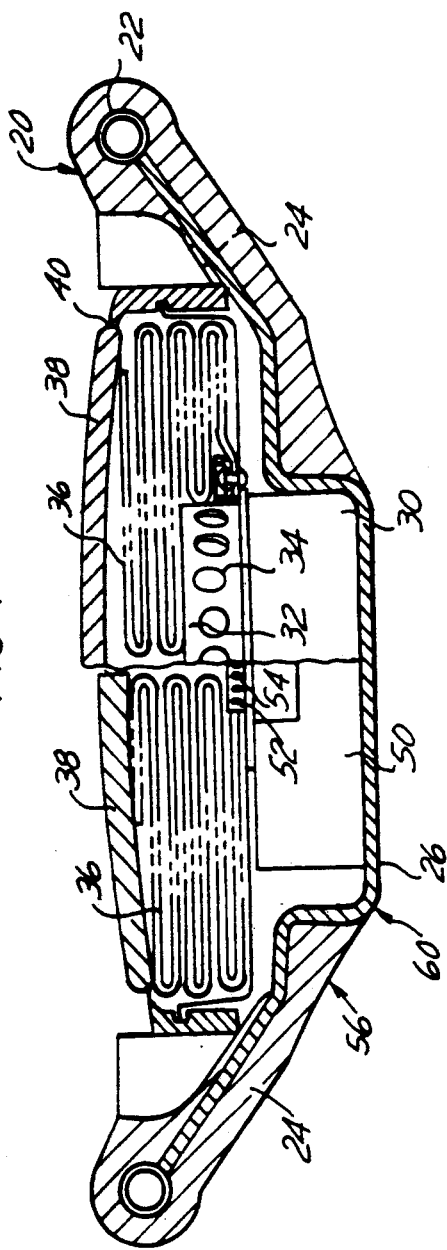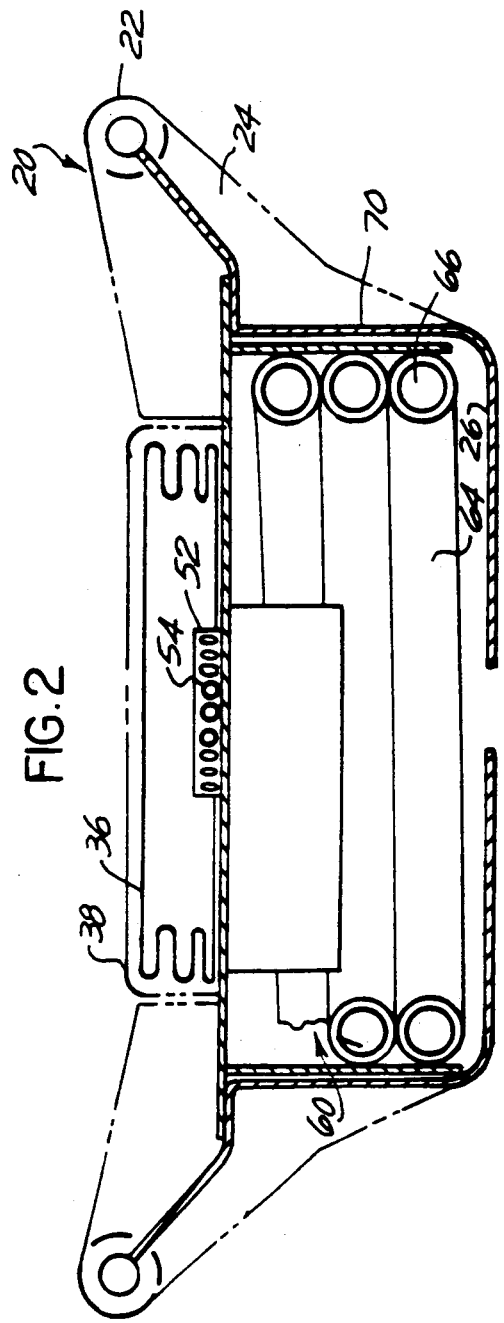

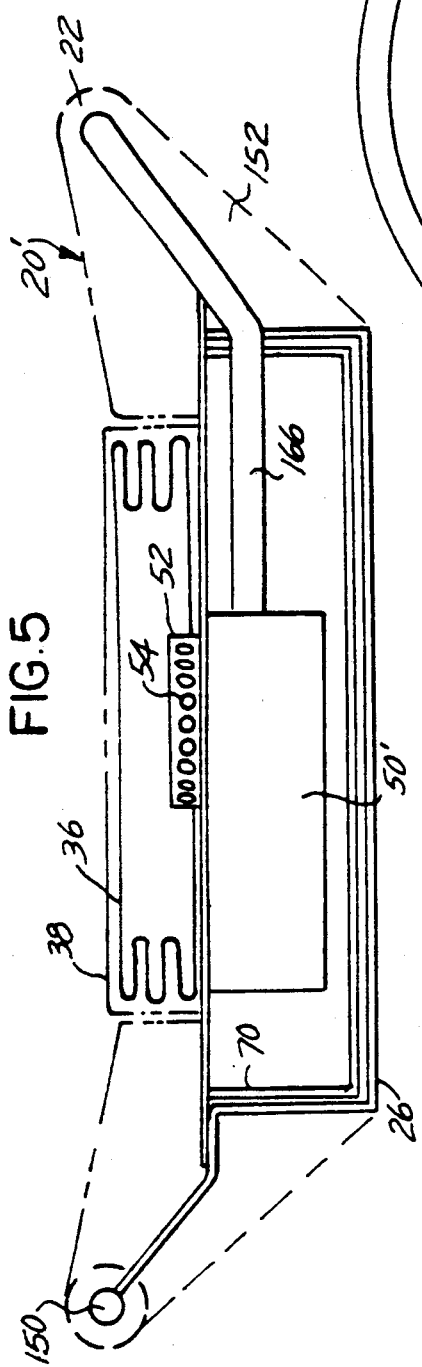
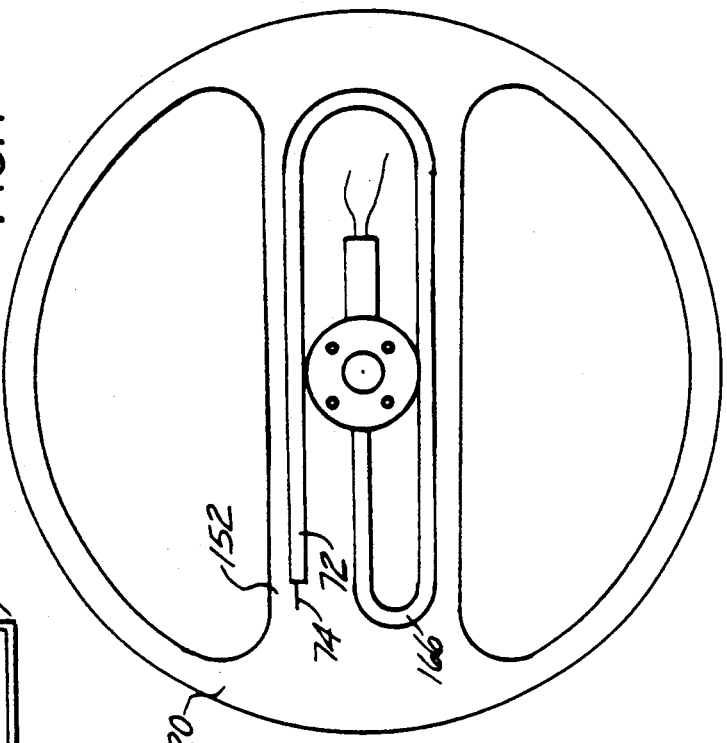
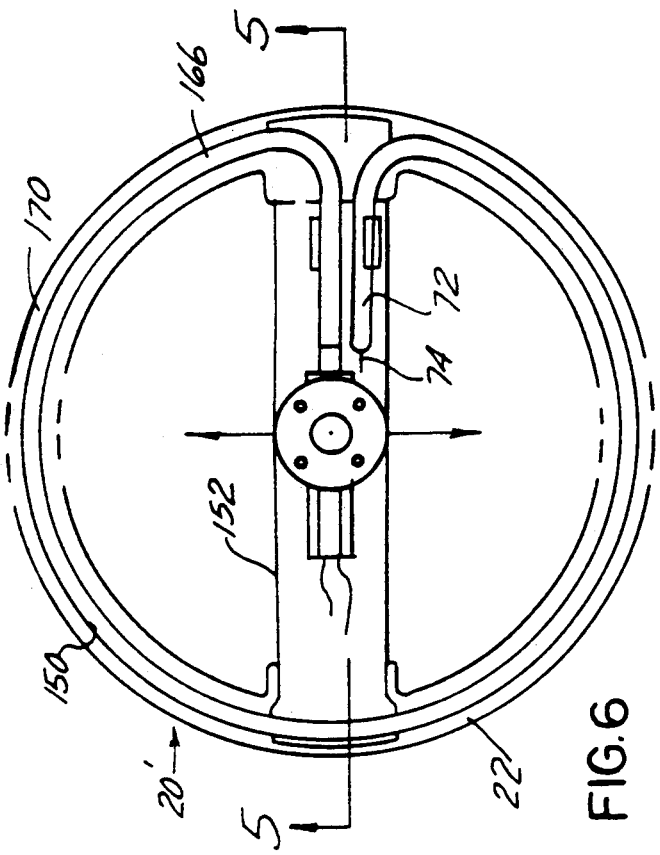

FIG. 8
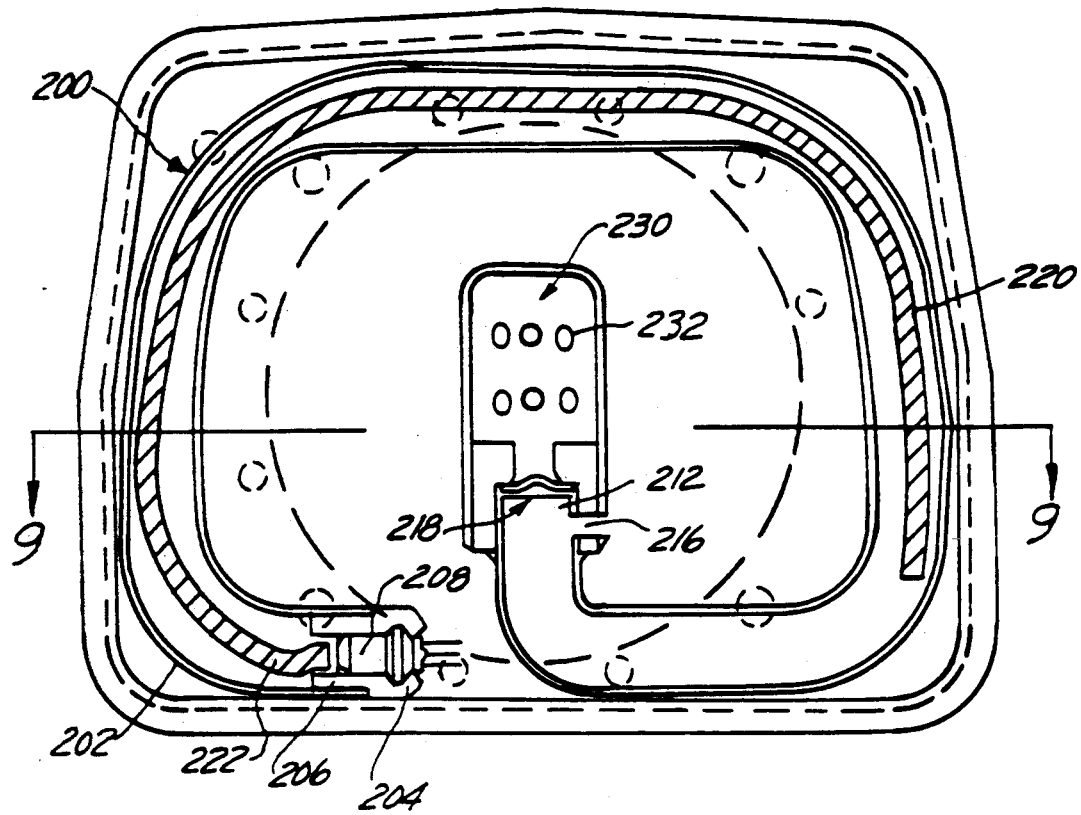
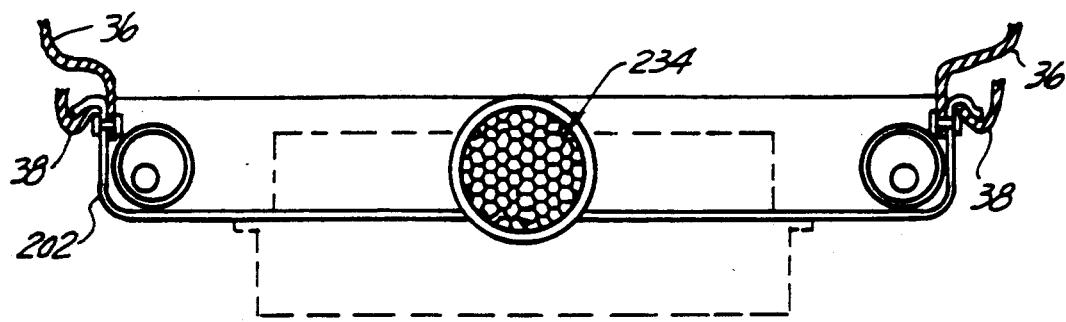
FIG. 9

DRIVER SIDE HYBRID INFLATOR AND AIR BAG MODULE

BACKGROUND AND SUMMARY OF THE INVENTION

The present invention relates to a hybrid or stored gas inflator for an air bag and more particularly an inflator for a driver side air bag.

An object of the present invention is to provide a hybrid inflator for installation within a steering wheel to inflate a driver side air bag. Accordingly, the invention comprises: a pressure vessel formed of a length of narrow tubing for storing a quantity of inert gas under pressure and seal for enclosing a first end of the tubing; an activator such as a pyrotechnic squib responsive to a control signal indicative of a vehicular crash situation for opening the seal means to permit the pressurized gas to inflate the air bag and a manifold for communicating released gas to the air bag. The pressure vessel may be disposed within a hub portion of a steering wheel or alternatively disposed within the rim and or spokes of the steering wheel. The actuator includes a length of propellant material which may be positioned exterior or interior to the pressure vessel or as an integral part of the pyrotechnic squib.

Many other objects and purposes of the invention will be clear from the following detailed description of the drawings.

BRIEF DESCRIPTION OF THE DRAWINGS

In the drawings:

FIG. 1 illustrates a cross-sectional view of a steering wheel showing the comparison between a solid propellant type gas generating device and a hybrid inflator/module in accordance with the present invention.

FIG. 2 illustrates a more detailed cross-sectional view of a hybrid inflator/air bag module in accordance with the present invention.

FIGS. 5 and 6 illustrate an alternate embodiment of the present invention.

FIG. 7 illustrates a further embodiment of the present invention.

FIGS. 8 and 9 illustrate another embodiment of the present invention.

DETAILED DESCRIPTION OF THE DRAWINGS

Figure 3:
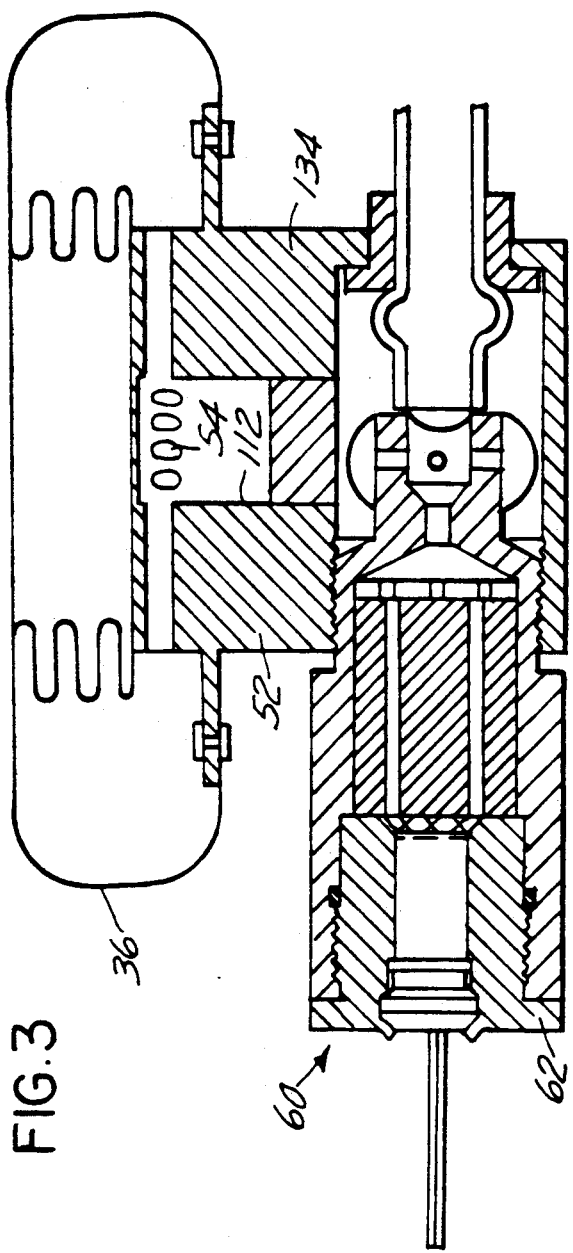
FIGS. 3 and 4 illustrate various views of a first embodiment of a hybrid inflator constructed in accordance with the present invention.

Reference is made to FIG. 1 which illustrates a cross-sectional view of a typical steering wheel 20. The steering wheel typically comprises a circular rim portion 22 and a plurality of spokes 24 extending between the rim 22 and a hub 26. The right hand portion of FIG. 1 illustrates the typical prior installation of what is known as a driver side air bag module comprising a solid propellant type gas generator of known variety comprising a manifold 32 having outlet ports 34. Positioned about the manifold 34 is an air bag 36 in folded configuration. The air bag is maintained within the steering wheel by a cover 38 having a tear line 40. Upon inflation of the air bag 36, the cover 38 is opened at the tear line 40 to permit the air bag to expand, thereby protecting the occupant. Position on the left hand side of FIG. 1 is a schematic representation of the present invention comprising a hybrid inflator 50. The inflator 50 includes a manifold 52 defining a plurality of outlet ports 54. A module 60 would include the inflator 50, air bag 36 and perhaps cover 38 and a steering wheel 20. An advantage of the present invention is that it is believed that the hybrid inflator 50, air bag and cover can be assembled in a much smaller package that the prior art solid propellant inflator 30. This smaller packaging is diagrammatically illustrated in the left-side cross-sectional view of FIG. 1.

Figure 4:
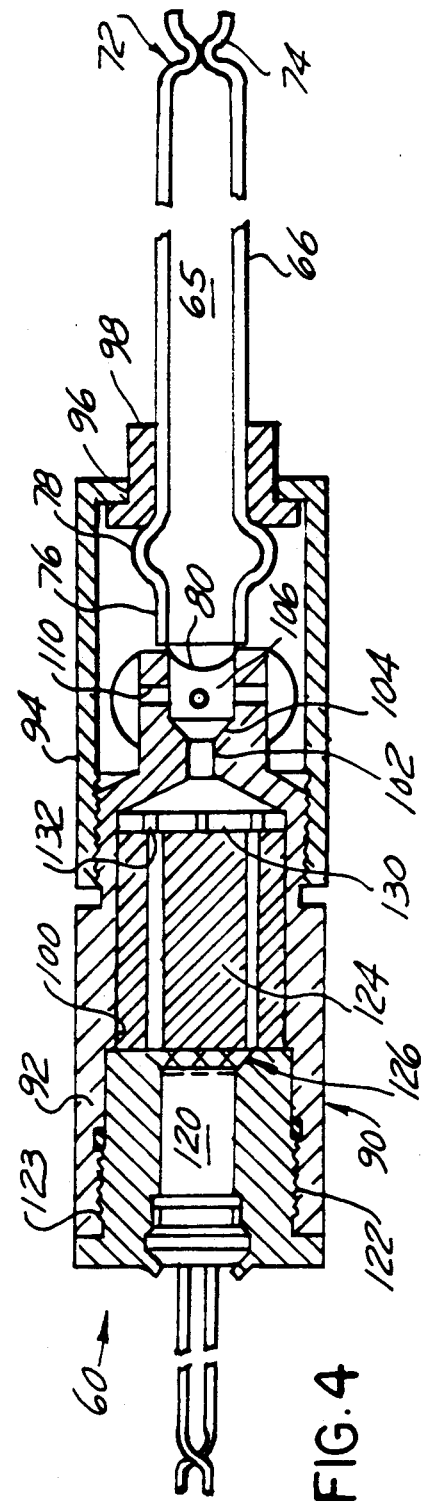

With reference to FIGS. 2 through 4, there is shown a hybrid inflator module 60 incorporating an inflator 50 within the hub 26 of the steering wheel 20. The hybrid inflator module 60 comprises an activation portion generally shown as 62 and a means, such as a pressure vessel, for storing pressurized gas generally shown as 66. In the embodiment of the invention shown in these figures, the means for storing the pressurized gas 65 comprises a section of tubing 66 which is positioned within a housing 70. As shown, the tubing is formed in a coiled or cylindrical configuration. The length of the coil, i.e., number of turns, depends upon the volume of gas to be stored. One end 72 of the tubing (see FIG. 4) comprises an inlet or fill end in which pressurized inert gas such as Argon is placed into the tubing 66. Upon filling the tubing 66 to a designated pressure, the end 72 is crimped and welded or otherwise sealed at 74 to retain the gas therein. The pressure of the inert gas 65 may be in the range of 6.9 megaPascal (1,000 psi) to 26 megaPascal (4,000 psi), however, a pressure of 20.7 megaPascal (3,000 psi) is thought to be suitable for the present application. In addition, the typical volume of the tubing is approximately 15.7–20.3 cubic centimeters (7–8 cubic inches). The other end 76 of the tubing includes a flared portion 78. Secured to the end 76 of the tubing 66 such as by a resistance weld is a burst disk 80. The burst disk 80 may comprise a thin wafer of stainless steel, pure Nickel or a Nickel alloy. After pressurization, the disk typically domes as shown in FIG. 4.

The activation portion 62 of the hybrid inflator 50 comprises a housing 90 which includes a fitting 92 which receives a coupling 94. The coupling 94 includes an opening 96 for receipt of a hollow nut 98 which is positioned about the flared portion 78 of the tubing.

The fitting 92 comprises a stepped bore 100 and includes a narrow passage 102 which forms a portion of a divergent nozzle generally shown as 104. The nozzle communicates with a mixing chamber 106 disposed adjacent to the disk 80. Formed within the fitting 92, about the mixing chamber 106, are a plurality of radially extending passages 110. The passages 110 are communicated to the manifold 52 through a passage 112, which may contain a screen or strainer 134 to further prevent particulates generated by the material 124 from entering the air bag or cushion 36.

The activating portion 62 includes a pyrotechnic squib 120, initiator or the like of known variety. The squib 120 is typically internally connected with a resistance wire in a known manner which will produce a suitably high temperature to ignite the squib in response to an electric signal. The squib 120 is received within a squib housing 122 which is threadably received at 123 in the fitting 92. Positioned within the bore 100 is a quantity of pyrotechnic material 124 such as Arcite, as disclosed in U.S. Pat. No. 3,723,205, which is incorporated herein by reference. As is known in the art, material such as Arcite can be extruded in many desired shapes. The material 124 may be solid or may be formed with a cross-section resembling a cloverleaf having a passage through each of the three lobes of the cloverleaf. Disposed between the squib 120 and material 124 is a screen-like element 126, the purpose of which is to distribute the heat generated by the squib in a uniform manner to the material 124. The screen 126 also tends to filter particular matter generated as the squib burns. Disposed within the bore 100, at the other side of the material 124, is a diffuser/particulate trap 130 having a plurality of passages 132 therethrough. The passages 132 evenly distribute the gases generated by the material 124 prior to communication of same to the nozzle 104. The trap also tends to cause the gases generated by the material 124 to move into the nozzle at a uniform pressure and velocity and supports the propellant during burning so that it is contained within the chamber 100.

The operation of the embodiment of the invention above disclosed is as follows. In response to a signal generated in a known manner indicative of a crash situation, a control signal is communicated to the squib 120 which ignites the material 124 causing same to burn at an elevated temperature to generate a known quantity of gas and flame. This heated media is communicated through the nozzle 104 and directly onto the burst or rupturable disk 80. The temperature of the burst disk is increased to a sufficient magnitude to weaken it to the point of rupture, thereby permitting gases within the pressure vessel, i.e., tubing 66 to flow into the mixing chamber 106 and then into the air bag. As the material 124 continues to burn and enters the mixing chamber, it mixes with the inert gas 65 thereby increasing the temperature and volume of this stored gas as it exits the passages 110 thereby enhancing its ability to inflate the air bag 36.

Reference is made to the alternate embodiment of the present invention shown in FIGS. 5 and 6. More particularly, there is shown a steering wheel 20' having a hollow core generally shown by bore 150. Positioned within a center spoke 152 of the steering wheel 20' is a hybrid inflator 50' having an activation portion 62 identical to that shown in FIGS. 3 and 4. The pressure vessel, i.e., tubing 166 is connected to the activation portion 62 in like manner to that shown in FIGS. 3 and 4. Rather than using a coiled configuration of tubing as shown in FIG. 2, the embodiment illustrated in FIGS. 5 and 6 shows that such tubing 166 can be fed through the center spoke 152 and into the bore 150 in the rim 22 of the steering wheel 20'. The end 72 of the tubing 166 terminates within the center spoke 152. The tubing may be filled as before and crimped at 74. As mentioned above, the tubing 166 may be fitted within the bore 150 of a steering wheel, thereby taking advantage of the tubular construction generally found in many steering wheels. Alternatively, the steering wheel 20' may first be constructed of steel tubing arranged in the manner shown in FIG. 6. Thereafter, an outer shell, generally shown as 170, may be molded thereabout forming the exterior of the steering wheel 20'. An apparent advantage of the embodiment shown in FIGS. 5 and 6 is that the package size of the hybrid inflator shown therein, and in particular, the depth of the hybrid inflator as measured from the air bag cover 38 to the steering wheel hub 26 or inflator housing 70, is dramatically reduced as compared to the prior art.

FIG. 7 illustrates a further embodiment of the present invention wherein the tubing 166 is coiled within the center spoke 152 of a steering wheel such as 20.

With reference to FIGS. 8 and 9, there is illustrated a further embodiment of the present invention which illustrates a hybrid inflator generally shown as 200. The hybrid inflator 200 includes an inflator housing 202, adapted to be mounted to a steering wheel such as 20 (not shown). Positioned within the housing 202 is an actuator 204 comprising an actuator housing 206 and squib 208 substantially identical to the housing 122 and squib 120 shown in FIG. 4. Secured to the actuator housing 206 is a pressure vessel 210 comprising a length of tubing substantially circumferentially disposed about the inner wall of the housing 202. Disposed at the end 212 of the tube 210 is a burst disk 214. A fill tube or port 216 is provided somewhere along the length of the tubing 210 through which the tubing is filled with Argon gas. This fill tube or port 216 may later be sealed in a known manner. Positioned slightly downstream of the burst disk 214 may be a particulate screen or trap 218. As is known in the art, the Arcite propellant disclosed in U.S. Pat. No. 3,723,205 is capable of being extruded. Disposed within the tubing 210 is an extruded ribbon or rod of Arcite propellant generally shown as 220. One end 222 of the propellant material is positioned proximate the squib 208 and extends through most if not all of the tubing 210. It is contemplated that the size of such propellant ribbon may be approximately 5 millimeters in diameter and approximately 400 millimeters in length. Connected to the end 212 of the tubing 210 is a diffuser 230 having a plurality of exit ports 232 therein. A filter media 234 may be disposed within the diffuser 230 to eliminate any particulates generated upon the burning of the propellant 220. An air bag is mounted to the housing 202 to receive gas as it exits the diffuser 230. A cover 38 can be used to retain the air bag 36.

In operation, the ignitor is activated by a control signal signifying a crash situation. The ignitor 208 ignites the end 222 of the propellant ribbon 220 thereby causing same to burn. The increased temperature generated by the burning propellant 220 elevates the pressure of the stored gas within the pressure vessel 210, thereby causing the disk 214 to rupture, thereupon inflation gas is available to inflate the air bag 36 which may be mounted to the housing 202. By utilizing an extended length of propellant 220 formed in the above-described ribbon or rod, it is possible to substantially match the burn time of the propellant 220 with the time (after rupture of the disk 214) it takes to expel all of the stored gas. In this manner, the propellant 220 is constantly burning during the period of air bag inflation, thereby continuously heating the expelled, stored Argon gas. In this manner, the temperature of the stored Argon gas during the entire inflation period is elevated, thereby increasing the volume thereof which further enhances the ability of the gas to inflate the air bag.

Since the propellant burns in the Argon pressure chamber, the mixing of hot and cold gas is optimized.

Many changes and modifications in the above described embodiment of the invention can, of course, be carried out without departing from the scope thereof. Accordingly, that scope is intended to be limited only by the scope of the appended claims.

We claim:

1. A device for inflating an air bad adapted to be mounted to a steering wheel comprising:

a pressure vessel formed of a length of narrow tubing for storing a quantity of inert gas under pressure and seal means for enclosing a first end of the tubing;

activation means responsive to a control signal indicative of a vehicular crash situation for causing the seal means to open to permit the pressurized gas to inflate an air bag and manifold means for communicating released gas to an air bag wherein the tubing is formed as a coil and wherein the coil and activation means are disposed within a central hub portion of the steering wheel.

2. The device as defined in claim 1 wherein an air bag is disposed about the manifold means, in a folded orientation, in a manner to receive gas to inflate same, and a cover secured relative to the steering wheel and over the folded bag.

3. The device as defined in claim 1 wherein the tubing proximate the first end includes a flared portion and wherein the housing of the activation means includes coupling means for engaging the flared portion for urging the seal means into the housing to form a fluid tight seal at the mixing chamber.

4. A device for inflating an air bad adapted to be mounted to a steering wheel comprising:
a pressure vessel formed of a length of narrow tubing for storing a quantity of inert gas under pressure and seal means for enclosing a first end of the tubing;
activation means responsive to a control signal indicative of a vehicular crash situation for causing the seal means to open to permit the pressurized gas to inflate an air bag and wherein the steering wheel comprises a rim, a central hub and a central spoke joining generally opposite sides of the rim and wherein the activation means is disposed within the hub and wherein the pressure vessel extends from the activation means and is formed in at least a singular coil within the central spoke.

5. A device for inflating an air bad adapted to be mounted to a steering wheel comprising:
a pressure vessel formed of a length of narrow tubing for storing a quantity of inert gas under pressure and seal means for enclosing a first end of the tubing;
activation means responsive to a control signal indicative of a vehicular crash situation for causing the seal means to open to permit the pressurized gas to inflate an air bag and
manifold means for communicating released gas to an air bag wherein the activation means is joined to a second end of the tubing in a manner to effect a fluid seal therebetween, the first end of the tubing supporting the seal means being remotely positioned from the activation means.

6. The device as defined in claim 5 wherein the activation means includes an initiator disposed at the second end of the tubing for increasing, upon activation, the pressure within the tubing and propellant means disposed within the tubing, and operatively situated relative to the initiator.

7. The device as defined in claim 6 wherein the propellant means is formed as an elongated length of propellant material extending a predetermined distance through the tubing.

8. The device as defined claim 7 wherein the manifold means is disposed about the seal means to receive gas therefrom.

9. The device as defined in claim 8 wherein the manifold means includes a filter therein for filtering the gas prior to its entry into the air bag.

10. The device as defined in claim 5, wherein an air bag is disposed about the manifold means, in a folded orientation, in a manner to receive gas to inflate same, and a cover secured relative to the steering wheel and over the folded bag.

11. The device as defined in claim 6 wherein the tubing proximate the first end includes a flared portion and wherein the housing of the activation means includes coupling means for engaging the flared portion for urging the seal means into the housing to form a fluid tight seal at the mixing chamber.

* * * * *